(No Model.)  12 Sheets—Sheet 1.

A. HARDEGGER.
EMBROIDERING MACHINE.

No. 255,284.  Patented Mar. 21, 1882.

WITNESSES  
Wm A. Skinkle  
Ernest Abshagen

INVENTOR  
Albert Hardegger,  
By his Attorney James L. Norris.

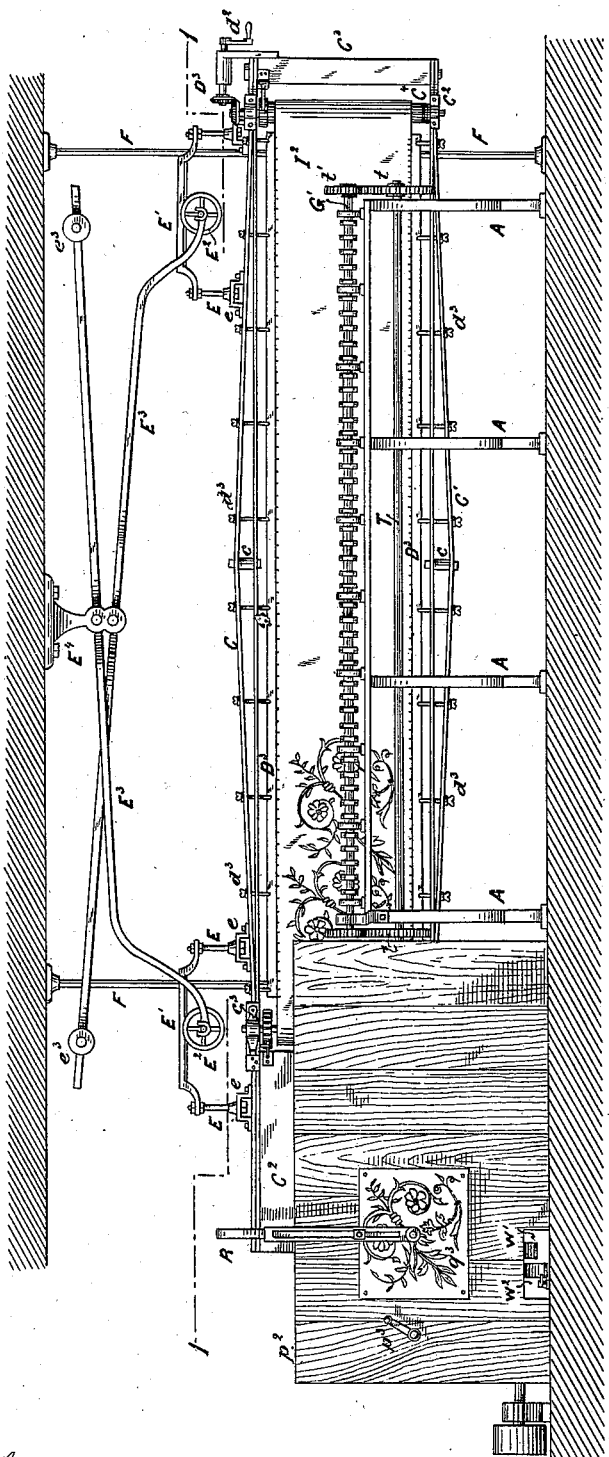

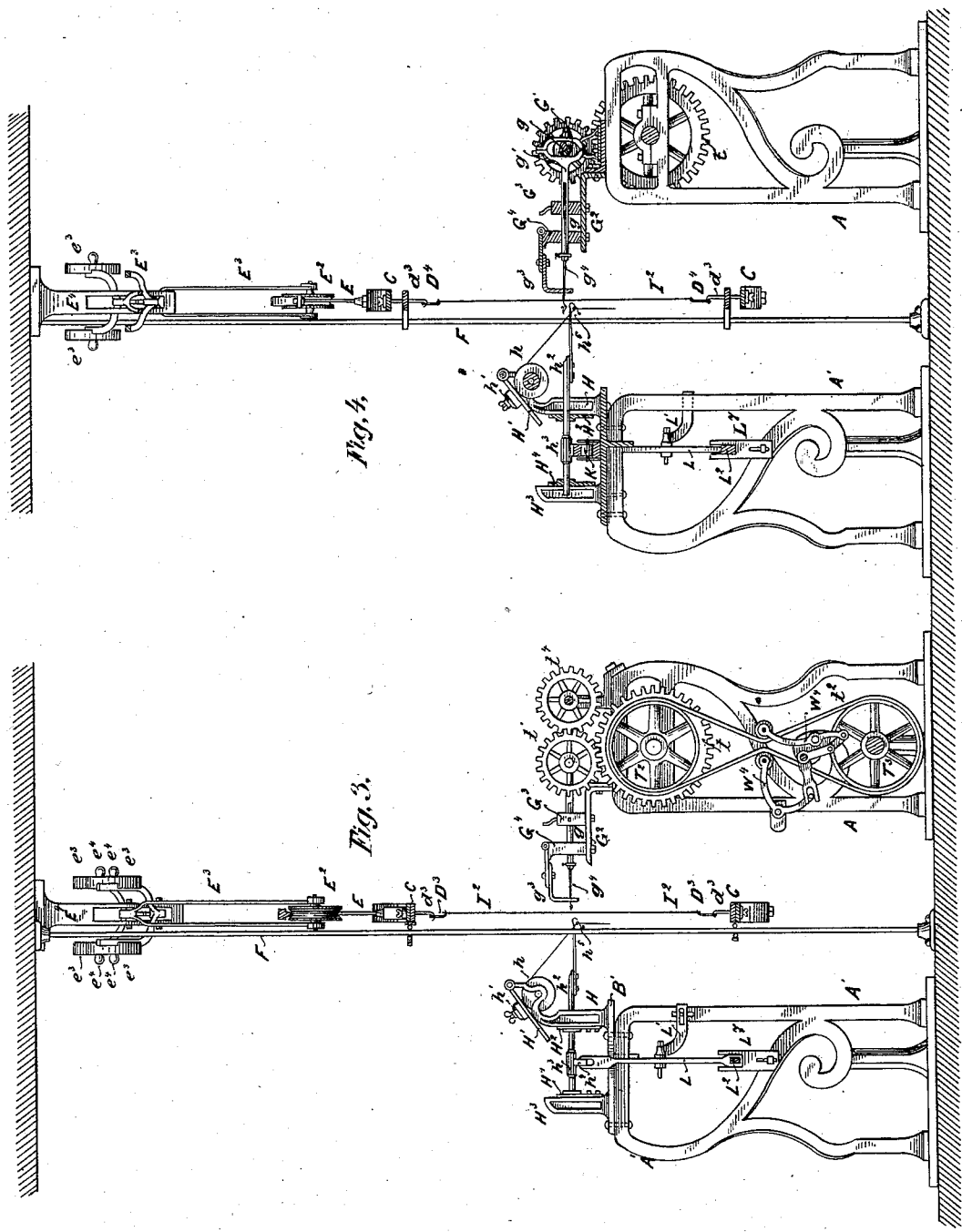

(No Model.)
A. HARDEGGER.
EMBROIDERING MACHINE.
No. 255,284. Patented Mar. 21, 1882.
12 Sheets—Sheet 4.
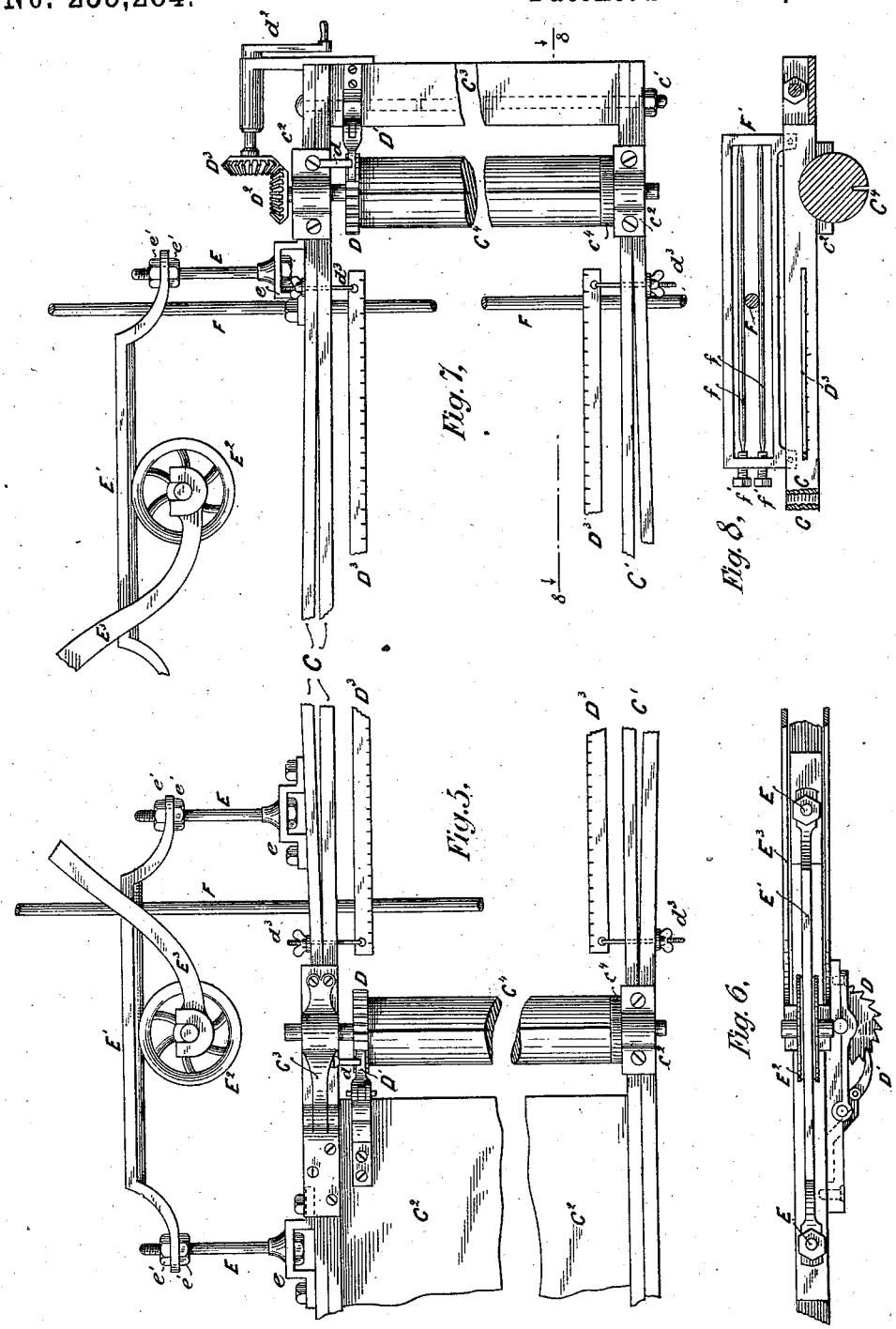

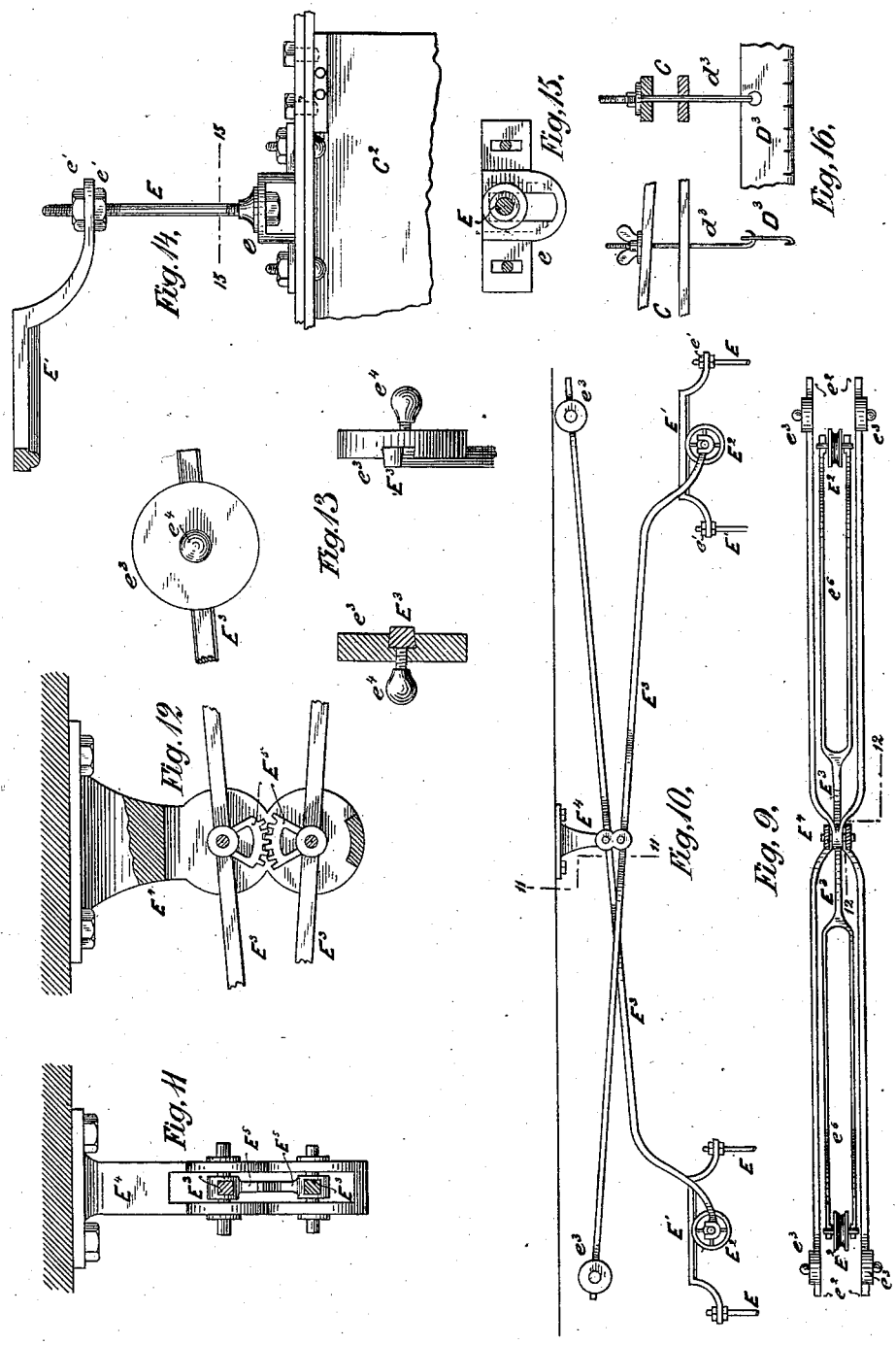

(No Model.) 12 Sheets—Sheet 6.
A. HARDEGGER.
EMBROIDERING MACHINE.
No. 255,284. Patented Mar. 21, 1882.
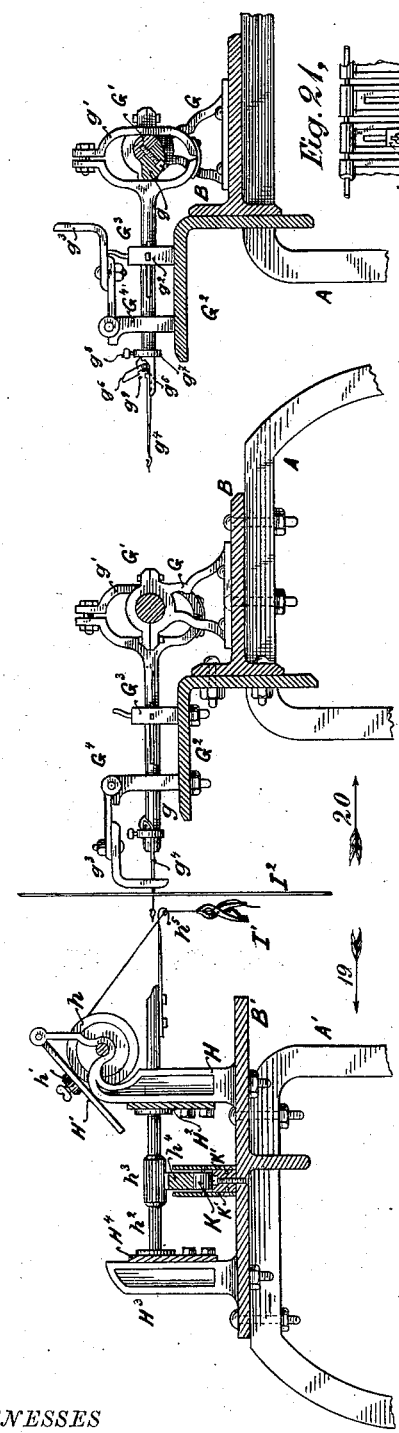
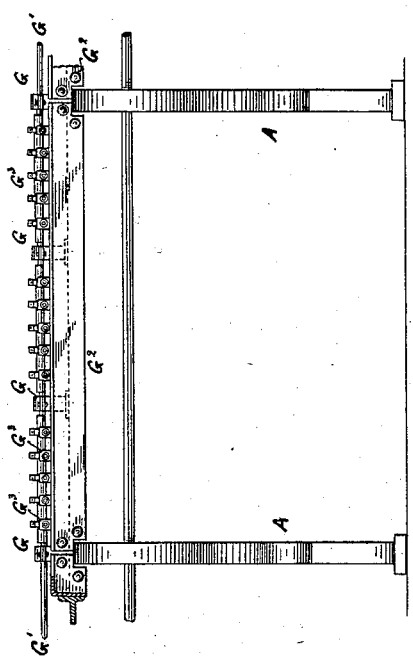
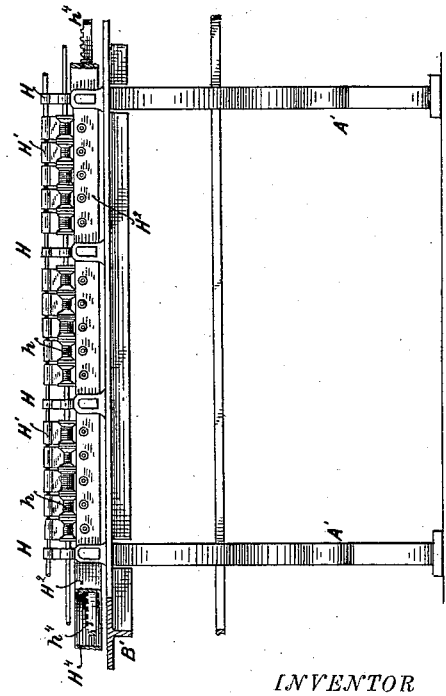
WITNESSES
Wm A. Skinkle.
Ernest Abshagen
INVENTOR
Albert Hardegger,
By his Attorney James L. Norris.

(No Model.)  12 Sheets—Sheet 7.
A. HARDEGGER.
EMBROIDERING MACHINE.
No. 255,284.  Patented Mar. 21, 1882.
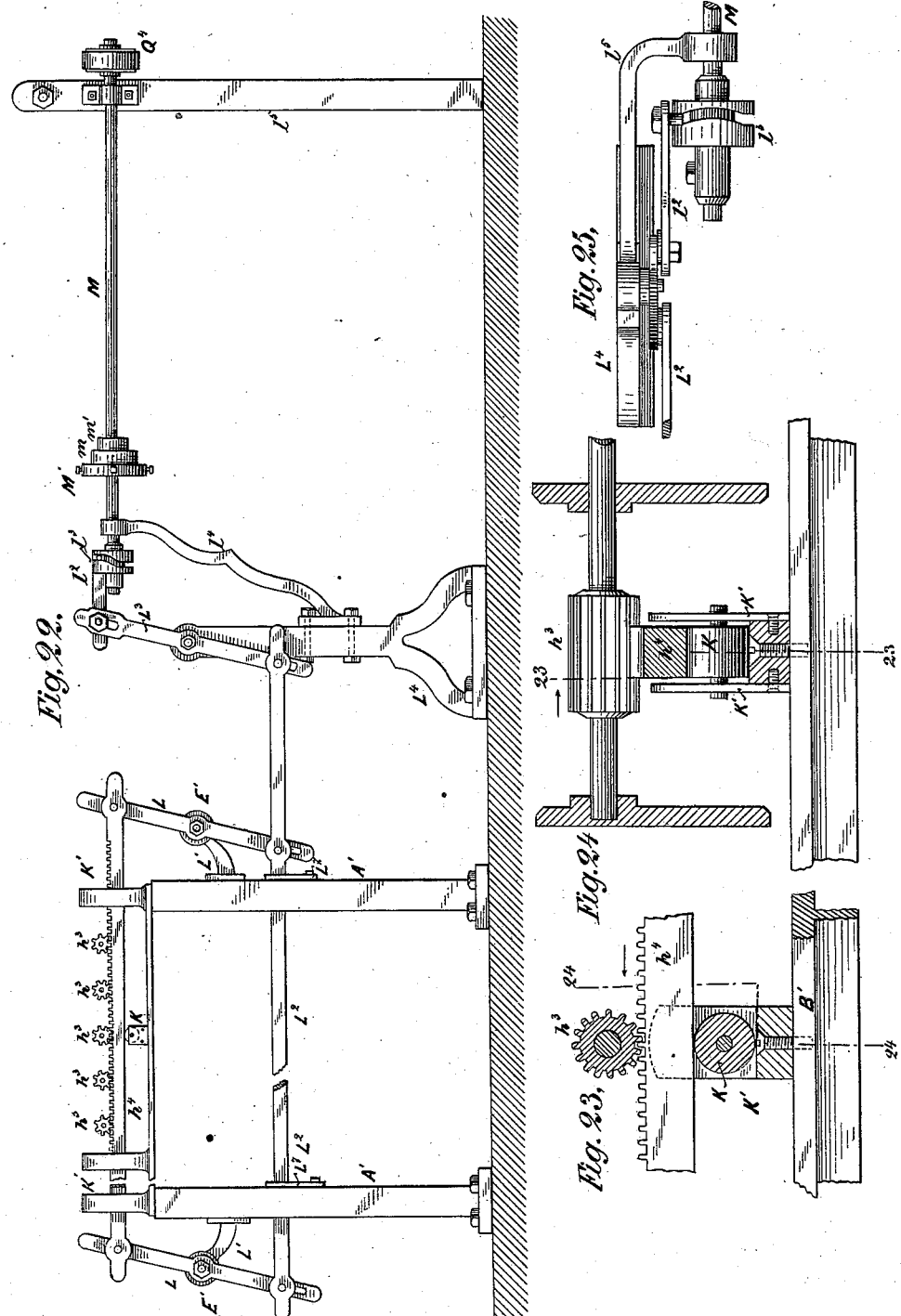
WITNESSES
Wm. A. Skinkle
Ernest Abshagen
INVENTOR
Albert Hardegger,
By his Attorney
James L. Norris.
N. PETERS. Photo-Lithographer, Washington, D. C.

(No Model.) 12 Sheets—Sheet 8.
A. HARDEGGER.
EMBROIDERING MACHINE.
No. 255,284. Patented Mar. 21, 1882.
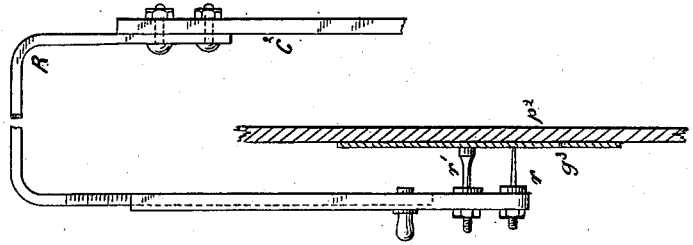
Fig. 27.
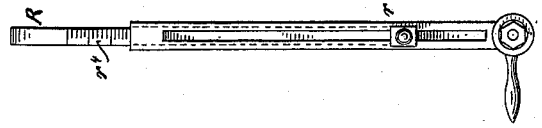
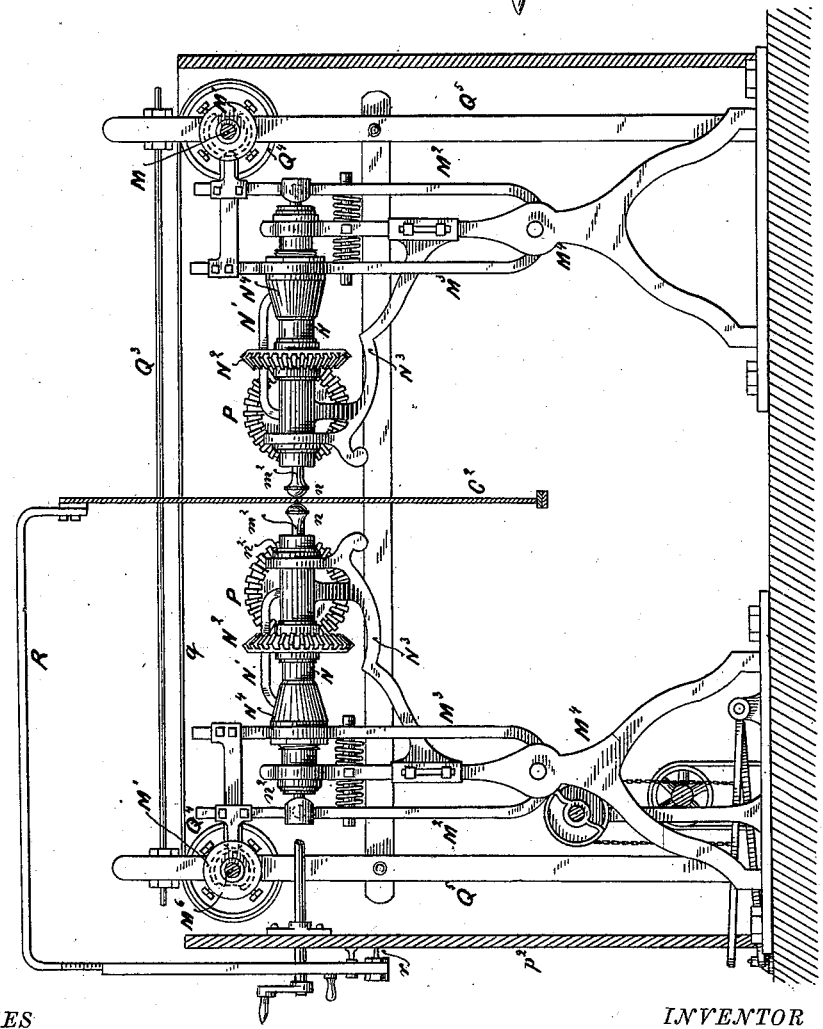
Fig. 26.
WITNESSES
Wm A. Skinkle
Ernest Abshagen
INVENTOR
Albert Hardegger,
By his Attorney
James L. Norris

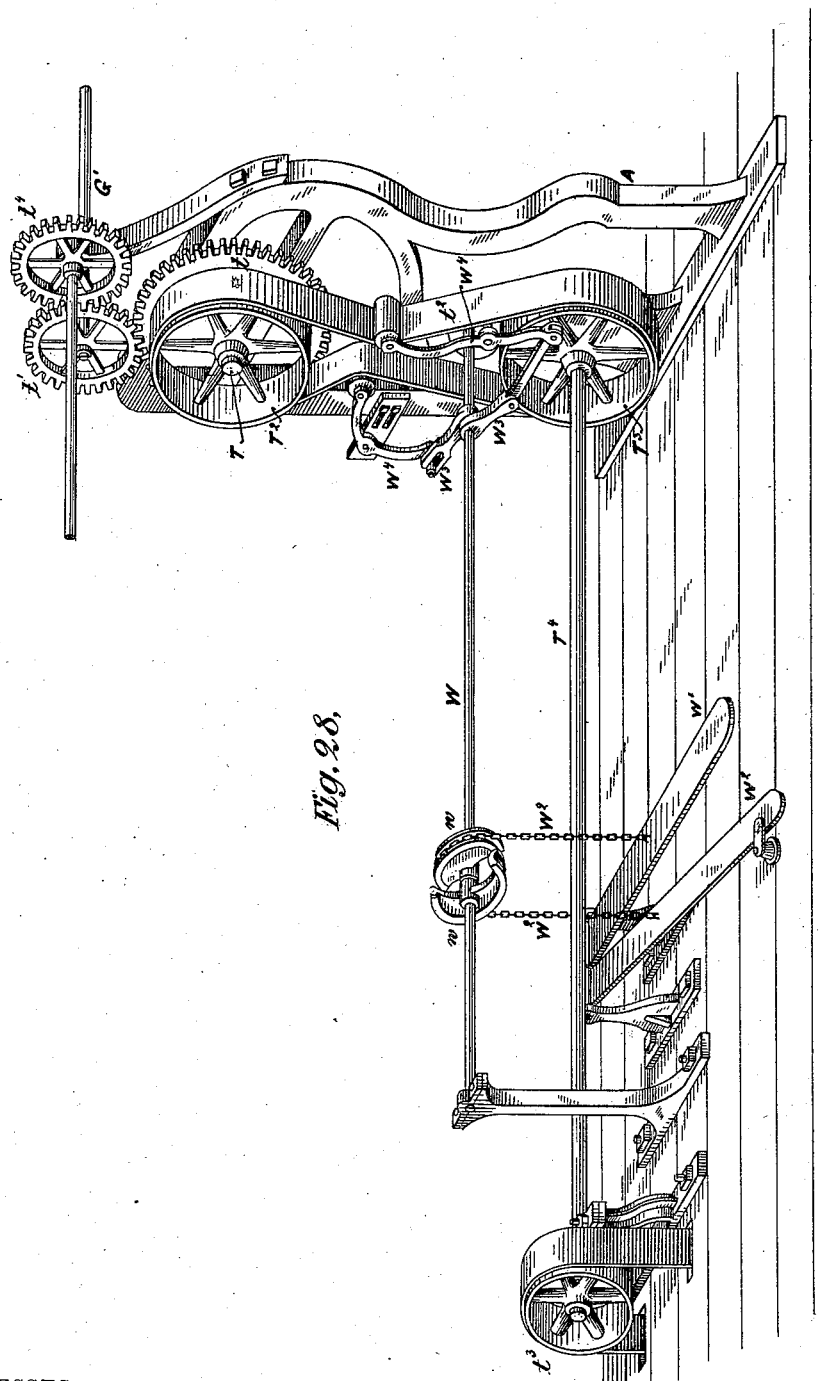

(No Model.)  12 Sheets—Sheet 10.
A. HARDEGGER.
EMBROIDERING MACHINE.
No. 255,284. Patented Mar. 21, 1882.
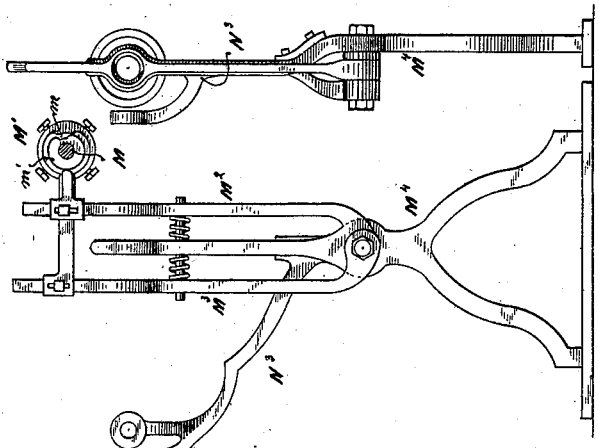
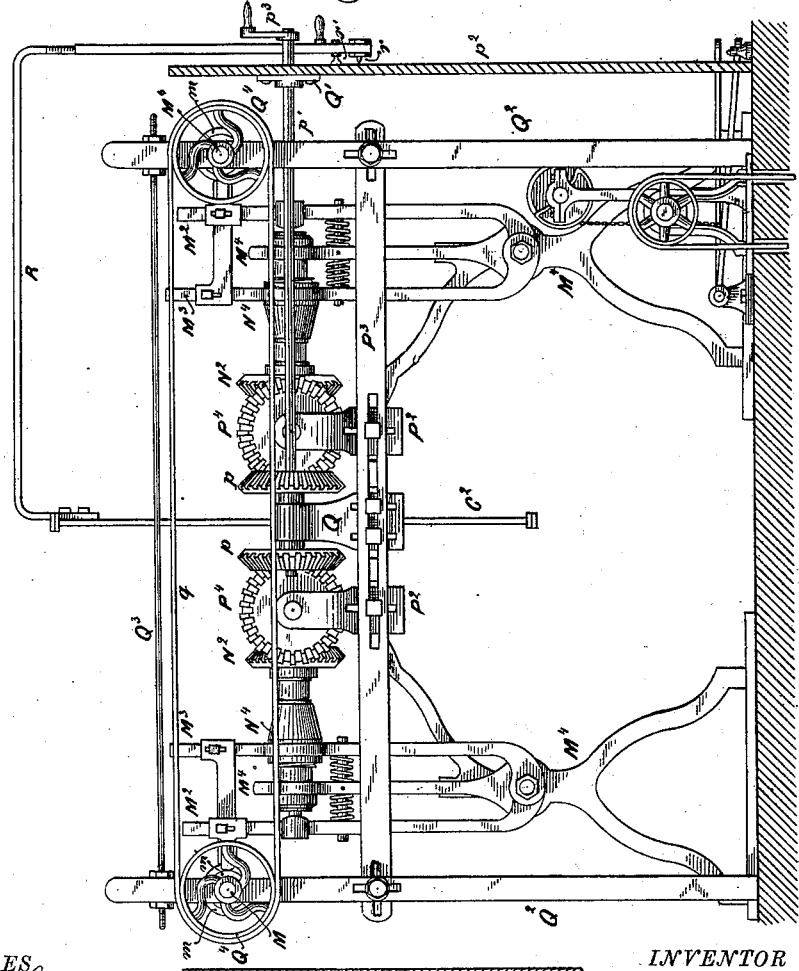
WITNESSES  
Wm A. Skinkle  
Ernest Abshagen
INVENTOR  
Albert Hardegger,  
By his Attorney James L. Norris.

(No Model.) 12 Sheets—Sheet 11.

A. HARDEGGER.
EMBROIDERING MACHINE.

No. 255,284. Patented Mar. 21, 1882.

WITNESSES
Wm A. Skinkle
Ernest Abshagen

INVENTOR
Albert Hardegger
By his Attorney
James L. Norris

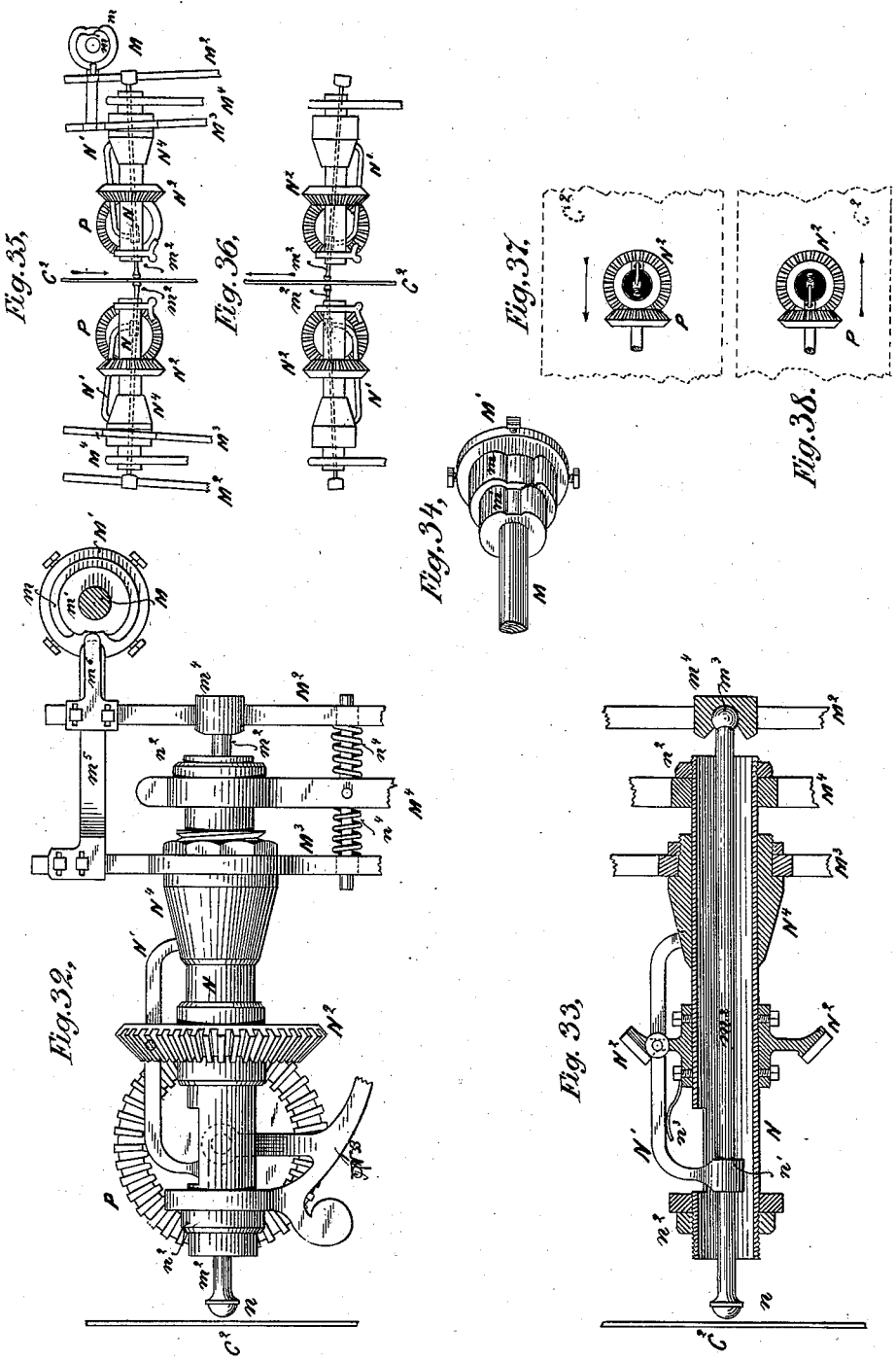

UNITED STATES PATENT OFFICE.

ALBERT HARDEGGER, OF NEW YORK, N. Y.

EMBROIDERING-MACHINE.

SPECIFICATION forming part of Letters Patent No. 255,284, dated March 21, 1882.

Application filed October 24, 1881. (No model.)

*To all whom it may concern:*

Be it known that I, ALBERT HARDEGGER, a citizen of the Republic of Switzerland, but now residing in the city of New York, county and State of New York, have invented certain new and useful Improvements in Embroidery-Machines, of which the following is a specification.

This invention relates to a machine for embroidering fabrics; and it consists in the features of construction and combination hereinafter described, and specified in the claims.

It will be understood that the machine can be made of any required size, and that any desired number of needles can be employed, the number of needles and other parts hereinafter mentioned being simply given for convenience in describing the machine.

Figure 1:
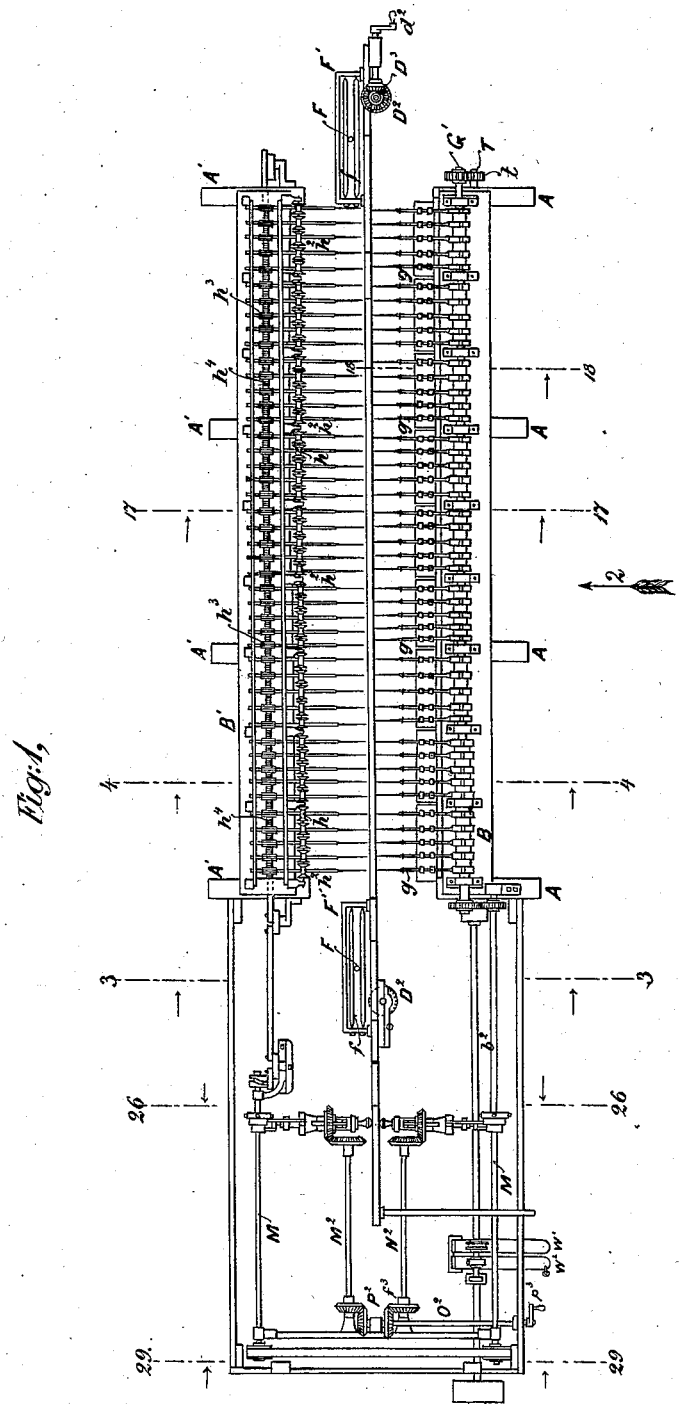
Figure 30:
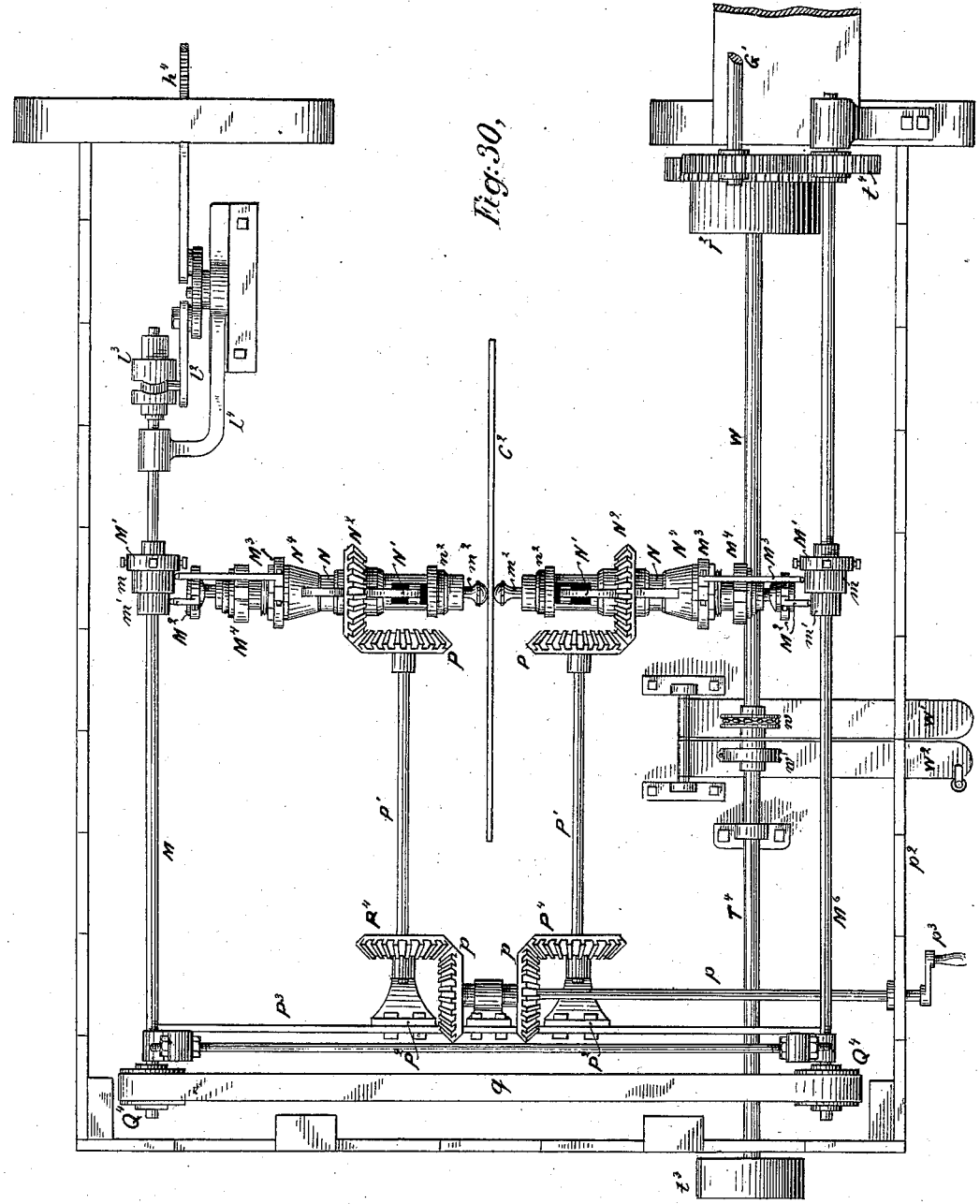

In the drawings, Figure 1 is a section on line 1 1 of Fig. 2. Fig. 2 is a side elevation of part of machine. Fig. 3 is a transverse section on line 3 3 of Fig. 1. Fig. 4 is a transverse section on line 4 4 of Fig. 1. Fig. 5 is an elevation of the left end of the fabric - carrying frame. Fig. 6 is a top view of part of said frame. Fig. 7 is an elevation of the right side of said frame. Fig. 8 is a section on line 8 8 of Fig. 7. Fig. 9 is a plan, and Fig. 10 an elevation, of the counterbalancing-levers. Fig. 11 is a vertical transverse section on line 11 11 of Fig. 10. Fig. 12 is a longitudinal section on line 12 12 of Fig. 9. Fig. 13 represents detail views of the counterbalancing-weight. Fig. 14 is an elevation of part of the frame, and Fig. 15 a section on line 15 15 of Fig. 14. Fig. 16 represents detail views of the stretcher-bars and their supports. Fig. 17 is a transverse section on line 17 17 of Fig. 1; Fig. 18, a like section on lines 18 18 of Fig. 1. Fig. 19 is a front elevation of two of the rear standards, with the spools and tension-plates; Fig. 20, a rear elevation of two of the front rows of standards, with some of the devices supported thereby. Fig. 21 represents in detail several of the weighted tension - plates. Fig. 22 is a rear elevation of the devices for actuating the thread-controller. Fig. 23 is a section on line 23 23 of Fig. 24. Fig. 24 is a section on line 24 24 of Fig. 23, and shows the rack bar and the pinion on the thread-controller, with the guides and rollers. Fig. 25 is a detail view of part of Fig. 22. Fig. 26 is a transverse section on line 26 26 of Fig. 1. Fig. 27 represents detail views of the pointer-arm. Fig. 28 is a perspective view of the belt-tightening devices. Fig. 29 is a sectional elevation on line 29 29 of Fig. 1. Fig. 30 is a plan view of the mechanism for actuating the thread-controllers and the cam-shaft. Fig. 31 represents detail views of the levers shown in Fig. 29. Fig. 32 is a side elevation of the devices for shifting the frame-carrying devices; Fig. 33, a longitudinal section of Fig. 32. Fig 34 is a detail view of the shaft and cams. Figs. 35, 36, 37, and 38 are views illustrating the mechanism for controlling the movement of the devices which shift the frame.

The main frame of this machine comprises two rows of standards, preferably four in each row, those in the front row being indicated by the letter A and those in the back row by the letter A'. Upon the standards A of the front row is supported a T-shaped bar, B, illustrated in cross - section in Figs. 17 and 18. This bar runs the entire length of the said row of standards, and is securely bolted to the top of each standard, thus connecting them rigidly together, and at the same time providing a bed-plate to which certain other portions of the machine, hereinafter described, are bolted.

To tops of the rear row of standards, A', is bolted a T-shaped bar, B', which rigidly connects said standards together, and which also serves as a bed-plate for certain other parts of the machine. The standards of the said rows are provided at their lower ends with suitable base-plates, which will be secured by screws or bolts to the floor. Between these two rows of standards is arranged a vertical frame, on which the material to be embroidered is stretched. This vertical frame is so suspended that it can be easily moved or shifted up or down, or in the direction of its length, by means of the devices under control of the operator, as hereinafter described, whereby the needles employed will pass through the fabric at the required points for reproducing the pattern.

Referring more particularly to Figs. 5 and 7, representing the two ends of said frame, C indicates an upper and C' a lower horizontal portion of the frame. Each of these parts comprises two metal strips or bars, preferably of wrought-iron. The two bars of each pair meet, and are secured together at their ends, but diverge from each other toward their middle portions, so that they will be separated at and near the middle of their length, at which latter point they are held by means of a small sleeve, c, Fig. 2, through which sleeve a tie-bolt passes, so as to bind the bars rigidly together. One end of the frame comprises a rectangular sheet-iron plate, $C^2$, to which the upper and lower horizontal bars are connected, and at the opposite end of the frame is a narrow vertical plate, $C^3$, which is rigidly clamped between the upper and lower bar by means of a tie-bolt, $c'$, having a tightening nut or nuts fitted thereon.

$C^4$ $C^4$ are the vertical rollers which are journaled in the frame, and upon which the fabric to be embroidered is wound. The cap-plates $c^2$ of the bearings for the journals of said rollers are detachably secured to the upper and lower bars, while the cap-plate $c^3$ will be hinged, so that it can be swung out from the frame to admit of the roller at this end of the frame being readily removed. The lower ends of these rollers are banded with metal, as at $c^4$, so as to strengthen them, while their upper ends are provided with ratchet-wheels D. Pawls D', acted upon by springs $d$, are arranged to engage said ratchets, so as to hold the rollers against rotation, the springs being pivoted in order that they can be swung to one side, and thereby allow the pawls to be disengaged from the ratches. The upper journal of the right-hand roller extends above its bearing, and carries a bevel-gear wheel, $D^2$, which is engaged by a similar gear-wheel, $D^3$, upon a shaft that has its bearing in a bracket secured to the end of the frame. This shaft is operated by a small crank, $d^2$, which is detachably fitted to the shaft, so that it can be removed when not in use. By turning this crank the roller at this end of the frame will be rotated so as to tightly stretch in the frame the material to be embroidered.

I also provide the horizontal stretching-bars $D^3$ $D^3$, (see also Fig. 16,) which are employed for stretching the fabric in the direction of its width. These stretching-bars extend along the sides of the frame, and are provided with many small bent teeth or hooks for engaging the edges of the fabric. These bent teeth will be conveniently formed by serrating and bending the stretching-bars at their edges. The stretching-bars are adjustably connected with the frame by hooked rods $d^3$, upon which are fitted thumb-nuts, by means of which the adjustment of said rods and bars is effected.

The devices for supporting the above-described vertically and horizontally movable frame, which carries the rollers upon which the fabric is wound and stretched, are as follows:

E E indicate four standards, which are supported in pairs upon the frame, near the ends thereof. These standards are fitted at their lower ends in metal castings or brackets $e$, that are bolted to the frame, and they are firmly secured in said castings by means of nuts fitted upon their lower screw-threaded ends. The bolts which secure the brackets $e$ in place pass through slots in the same, (see Fig. 15,) so as to allow the brackets to be adjusted in order to adjust the frame-holder and cause the frame to hang in proper position, and said brackets also project out from that side of the frame on which the rollers are located, and are slotted centrally to receive the standards E in order to admit of the adjustment just mentioned. Upon the upper ends of each pair of said standards is fitted a cross-bar, E', which is adjustably held in place upon the standard by upper and lower nuts, $e'$, and provided along its under side with a rounded tongue adapted to fit in the groove of the wheel $E^2$, upon which the said cross-bar rides. The grooved supporting-wheels $E^2$ have their axles arranged to turn easily in bearings in the lower ends of the long levers $E^3$ $E^3$. The lower ends of said levers are forked, as shown at $e^6$ in Fig. 9, so that the prongs thereof will embrace the sides of the cross-bars E', and thereby allow the levers to move without interfering with said cross-bars. These levers are arranged upon and turn freely about the separate pivots, which are supported in bearings in a bracket, $E^4$, that is firmly secured to a beam overhead. As illustrated in Fig. 9, the upper end of each lever is widely forked, as at $e^2$, so as to allow the narrow forks to pass through the same when necessary, and upon each prong of the upper forks is arranged a movable counterpoise-weight, $e^3$, provided with a set-screw, $e^4$, for the purpose of holding the weight in place at any desired point. By adjusting these weights the frame can be accurately counterbalanced, so that it will rise or descend with but a very slight expenditure of power.

As it is essential that the frame should at all times be maintained with its greatest length horizontal, I provide each lever with a sector-rack, $E^5$, rigid therewith. These sector-racks turn with their respective levers about the pivots of the latter, and are arranged to gear with each other, whereby a movement on the part of one lever will cause a simultaneous movement on the part of the remaining lever, and as the levers cross each other their lower ends will rise or fall uniformly and simultaneously.

To prevent any lateral swing of the frame I employ two vertical rods, F, which extend from the floor to the ceiling, back of the frame and adjacent to the ends of the latter, the said rods passing through guides which are secured horizontally to the four corners of the frame. These guides will, however, in no wise interfere with the proper vertical and endwise motions of the frame, and they are constructed as shown in Fig. 8, which illustrates one of said guides, composed of a rectangular frame, F', that is secured to the frame carrying the rollers, and a pair of parallel cylindrical rods, $f$, with conical ends or journals. These rods are journaled at one end in the frame, and at their opposite ends are journaled in the inner ends of set-screws $f'$, which can be tightened when the journals or pointed ends of the bars become worn.

The mechanism for operating the needles is best illustrated in Figs. 3 and 4, and also in Figs. 17 and 18. As therein shown, B indicates in cross-section the T-shaped bar or casting secured to one of the front standards, A, it being understood that said bar is bolted to the tops of all of said front standards, as already described. Bolted to this T-shaped bar at equal intervals are standards or pedestals G, preferably ten in number, four of which standards are illustrated in Fig. 20. These standards or pedestals G have bearings at their upper ends for the cam-shaft $G'$, which extends the entire length of the row of standards, and is provided at regular intervals with the cams $g$, one of which is shown in Figs. 4 and 18. These cams are secured by screws to the shaft between each support for the latter, the shaft being made cylindrical at the points where it has its bearings in the pedestals, and being cut away or flattened at the points where the cam-shaped pieces are secured to it. Bolted to the inner face of the vertical portion of the T-shaped bar B, and along the entire length of the same, are angle plates or brackets $G^2$, preferably nine in number, one of which and a portion of the next succeeding angle-plate are shown in Fig. 20. To these angle-plates $G^2$ are fixed a row of small standards, $G^3$—say one hundred and fifty in number—and immediately back of these small standards, and upon said angle-plate, is arranged a second row of standards, $G^4$, which row will comprise the same number of standards as the first row. The reciprocating needle-bars $g$ are arranged to slide freely through holes that are formed through these standards $G^3$ and $G^4$, the requisite movement being imparted to the needle-bar by means of the cams upon the cam-shaft acting against the walls of the yokes $g'$, with which the needle-bars are provided. Each yoke consists of two parts, hinged together at one end and detachably bolted together at their remaining ends, whereby the yokes can be readily opened in order to detach the same. Each needle-bar is prevented from turning in its bearings by means of a small pin, $g^2$, secured to standard $G^3$ and adapted to enter a slot formed longitudinally in the needle-bar.

I propose making some of the standards $G^4$ of greater height than the others in the same row—as, for example, the standards at intervals of three feet can be made the highest, and to these standards I hinge an angle-plate, $g^3$, which will extend the entire length of the row of needles, and which, as shown in end view in Figs. 3, 4, 17, and 18, is composed of two parts bolted together. The connecting-bolts of these two parts can pass through slots, so that the plate can be adjusted in width. This angle-plate is formed with holes or notches in its edge for the passage of the needles, and when swung forward and down, as in Fig. 17, it will frequently serve to hold the fabric in place as the needles are being drawn out of the same. When not in use, however, the hinged angle-plate can be thrown back out of the way, as shown in Fig. 18.

Each needle $g^4$ is held in its respective needle-bar between jaws $g^5$ $g^6$ of the latter, said jaws being closed upon the needle by means of a ring, $g^7$, arranged to slide over the jaws. The ring carries a set-screw, $g^8$, which can be tightened up so as to firmly clasp the upper hinged jaw upon the needle. The upper hinged jaw will also be provided with a recess, $g^9$, for receiving a projection on the butt-end of the needle.

The mechanism for controlling the thread is as follows: Upon the T-shaped bar or casting $B'$, which, as before stated, is secured to the rear set of standards, $A'$, is secured a row of pedestals or supports, H, (see Figs. 3, 4, 17, and 19,) which provide bearings for a shaft, upon which the spools $h$ are mounted. Upon a horizontal rod passing through the upper ends of these supports H are hung the weighted bars or plates $H'$, (see also Fig. 21,) which are adapted to rest upon the spools. These bars act as brakes or tension devices upon the spools, so as to keep the thread taut, the tension of the threads being regulated by varying the position of the weights $h'$, which can be adjustably connected with said tension-plates in any suitable manner and secured in position by means of set-screws. Attached to the rear sides of the supports H, and extending from one standard to the next along the entire row, are plates $H^2$, preferably nine in number, and to the front sides of a rear series of standards, $H^3$, are fixed a corresponding number of plates, $H^4$, which are parallel with the front set of plates, $H^2$, these said plates being shown in cross-section, Figs. 4 and 17, and in end view, Fig. 3, these plates affording bearings for a number of small bars or shafts, $h^2$—say one hundred and fifty—which I designate as the "thread-conductors." These shafts or thread-conductors pass through the plates, one of said shafts being arranged exactly opposite a needle. Each thread-conductor carries a small pinion, $h^3$, which is rigid thereon, motion being imparted to said pinions and shafts or conductors by means of a horizontal reciprocating rack-bar, $h^4$, which engages the pinions, as clearly shown in Figs. 22, 23, and 24. A spring-ring, $h^5$, is connected with each thread-conductor, the method of connecting the two, as herein shown, being to secure to the conductor a small spring bent into hook shape at one end, further formed with the ring at said bent end. The threads coming from the spools pass through and are held in these spring-rings, as illustrated.

The stitch employed is the ordinary chain-stitch, and is made as follows: At the start the end of the thread which passes through the spring-ring is held by a small weight, $I'$, which can consist of a pair of spring-jaws for griping the thread, or any other suitable weight can be employed, said weight being subsequently detached or cut off from the thread. When a needle has fairly passed through the fabric, which is indicated by the letter $l^2$, the rack-bar $h^4$, actuated by devices presently to be described, imparts one revolution to the thread-conductor $h^2$, which winds the thread once around the needle, the latter being at this juncture in position to receive the thread. The needle is then drawn back by means of the cam acting upon the yoke of the needle-bar, the needle carrying with it the loop of thread which has been caught by the hook that is at its point. The thread-conductor meanwhile is revolved back to its first position by a reverse movement of the rack-bar. The needle being now fairly out of the material that is to be embroidered, the frame carrying the fabric will be moved, by means hereinafter set forth, a distance equal to the length of one stitch, after which the needle again passes through the fabric, which does not admit of the loop already formed on the needle being again carried through it, but slips the loop out of the needle hook and back upon the shank of the needle. As the needle returns, drawing through the fabric a second loop of thread, formed as before described, it will draw said second loop through the first and now larger loop already formed, after which the above movements on the part of the frame, the needle, and the thread-conductor will be repeated. In this way, each loop being drawn through the one made just before it, the chain-stitch will be formed. The rack-bar which actuates the rotary thread-conductors is supported by and travels upon rollers K, (see Fig. 17, and also the enlarged views, Figs. 23 and 24,) which rollers have their bearings in the guide-plates K' K', that are attached to the angle bar or plate B'. As a means for reciprocating this rack-bar, I employ a pair of levers, L, which are pivoted to the rack-bar and to the brackets L', that are adjustably secured to the end standards of the rear row of standards, A'. It will be observed that in Fig. 22 the rack-bar and also a lower bar connecting the lower ends of the levers are shown broken away in order to avoid making said figure on too small a scale.

$L^2$ indicates the horizontal rod or bar which passes through adjustable guides $L^7$ and connects the lower ends of said levers. This rod extends beyond the row of standards A', and connects at its extended end with a lever, $L^3$, which is pivoted at or about the middle of its length to a small standard, $L^4$, that rises from the floor. This vibratory lever $L^3$ carries at its upper end an arm, $l^2$, having a pin which enters the cam-groove of a wheel, $l^3$, that is attached to one end of a rotary shaft, M, which has its bearings at the upper ends of a bracket, $l^4$, and a standard, $l^5$. This shaft is provided with a pulley, $Q^4$, driven by an endless belt, $q$, (see Fig. 30,) whereby the rotation of the shaft will, through the medium of the cam-grooved wheel and the several levers, impart the required reciprocating movement to the rack-bar. The belt $q$ also connects with a shaft that is driven by the mechanism employed for rotating the cam-shaft which operates the needles. The said movements of these parts are so timed that at each rotation of the cam-grooved wheel the rack will be moved once forward and once backward. These devices are also so driven that the rotary shaft carrying the cam-grooved wheel will rotate at the same rate of speed as the shaft carrying the cam that actuates the needle-bars, whereby the parts will perform their respective functions at the proper moments.

The mechanism for moving the frame, which is provided with the rollers upon which the fabric is wound, is provided with certain devices for acting upon the sheet-metal plate $C^2$, that is secured to one end of said frame, whereby the requisite motion will be imparted to the frame, as will be presently fully explained. This mechanism for moving the frame is the same on both sides of the plate $C^2$, so that a description of the devices at the front side of said plate will serve for a description of the devices arranged at the rear side of the same and adapted to operate in unison with the mechanism at the front side.

The shaft M is provided with a sleeve, M', (see especially Fig. 34,) which is adjusted in position upon the shaft by means of set-screws, preferably four in number. To this sleeve are secured the two cams $m$ and $m'$, the diameter of the cam $m$ being greater than that of the cam $m'$, as illustrated. These cams, at each revolution of the shaft upon which they are secured, impart a vibratory movement to the two levers which are pivoted at their lower ends to a standard, $M^4$, that is secured to the floor, each one of these levers having a horizontal arm which is acted upon by one of the said cams.

To the lever $M^2$ is connected by a universal joint a horizontal rod, $m^2$, (see especially Fig. 33,) which rod has at one end a ball, $m^3$, received in a socket in an enlarged portion, $m^4$, of said lever, so as to form said joint. This rod $m^2$ extends through a short hollow shaft, N, and is provided at its free end with a knob, $n$. As illustrated in Figs. 26, 30, 35, and 36, the knobs $n$ of the two rods press from opposite sides against the plate $C^2$ of the frame, said plate being held firmly between the knobs by the action of the cylindrical portion of the cam-ring $m'$ against the horizontal arm of the lever $M^2$ during the greater portion of the revolution of said cam. By means of the universal joint by which the rod $m^2$ is connected with the lever $M^2$ said rod will be capable of a lateral swing in any direction within the hollow shaft N. This rod passes through a ring or sleeve, $n'$, on one end of a bent lever, N', which passes into the hollow shaft N through a slot formed in the same. This bent lever is pivoted to a bevel-gear wheel, $N^2$, that is rigid upon the hollow shaft N, which said shaft rotates in bearings on the upper ends of the standard $M^4$, and an arm or bracket, $N^3$, that is adjustably secured to the standard. The hollow shaft is prevented from any longitudinal movement by means of its collars $n^2$ $n^2$. (See Fig. 33.) One end of the bent lever $N'$ extends into the hollow shaft and connects with the rod $m^2$, as above stated, while the other end of said lever bears against the face of a hollow cone, $N^4$, upon the hollow shaft, around which cone this end of the lever travels when the hollow shaft N is rotated. The hollow cone is loosely mounted upon the hollow shaft, so as to slide thereon, but does not partake of the rotary movement of the shaft by reason of its being attached to the vibratory lever $M^3$. Hence when this lever is thrown forward by the cam $m$ acting upon the horizontal arm $m^5$ of said lever the cone will be caused to slide upon the hollow shaft. The horizontal arms $m^5$ and $m^6$ of the levers $M^3$ and $M^2$ and the cams $m$ and $m'$ are so constructed and arranged that as the shafts M rotate the cylindrical part of the cam-piece $m'$ first acts upon the horizontal arms $m^6$ of the levers $M^2$, thereby causing the plate $C^2$ to be seized or griped between the knobs of the rods $m^2$. The cams $m$ then act upon the horizontal arms of the levers $M^3$, which in turn move the cones $N^4$ along their respective shafts N. The inclined faces of the cones acting upon the levers $N'$ cause them to turn upon their pivots, and thereby swing the rods $m^2$ within their respective shafts. This movement on the part of the rods will move the plate $C^2$ to the required extent. A spring, $n^3$, is arranged to act against the lever $N'$, so as to return it to its first position when the cone is drawn back, the return movement of the levers $M^2$ and $M^3$ to their first positions being effected by springs $n^4$, that connect the same with the standard $M^4$.

The direction in which the frame and its plate $C^2$ are moved depends upon the position the lever $N'$ occupies, and this position of said lever is changed by turning the bevel-gear wheel $N^2$, to which the lever is pivoted. This bevel-gear wheel gears with a bevel-gear wheel, P, which rotates with the shaft $P'$, supported in bearings on the bracket $N^3$, and the short standard $P^2$, that is connected with a horizontal bar, $P^3$. This standard has both a vertical and a lateral or horizontal adjustment by means of a connecting-bolt passing through slots in the standard and the horizontal bar, as illustrated in Fig. 29.

The shaft $P'$ carries at one end the bevel-gear P, as aforesaid, and at its opposite end carries a bevel-gear wheel, $P^4$, which engages with a like bevel-gear wheel, $p$, upon the shaft $p'$, which, as shown in Fig. 30, extends out through the front side of a casing, $p^2$, and is provided with a crank-handle, $p^3$, for the operator to take hold of, so as to turn the said shaft. It will be seen by this arrangement that the two shafts, $P'$, one in front of and one in rear of the plate $C^2$, will be simultaneously operated by the shaft $p'$. The shaft $p'$ is supported in bearings Q and $Q'$, the former of which is adjustably connected to the horizontal bar $P^3$ in the same way as the standard $P^2$, and the said horizontal bar is adjustably connected to the two standards $Q^2$ $Q^2$, which rise from the floor and are connected at their upper ends by a tie-rod, $Q^3$. The shafts M and $M^6$, (see Fig. 30,) which carry the cams $m$ and $m'$, have bearings in the standards $Q^2$ and $Q^5$, (see Figs. 26 and 29,) and are provided with rubber-faced pulleys $Q^4$, connected by an endless belt, $q$, by means of which motion will be transmitted from the shaft $M^6$, that is at the front of the machine, to the shaft M, that is at the rear side of the machine, and which carries the cam-grooved roller for actuating the rack-bar $h^4$ through the medium of the pivoted levers already described.
In Figs. 2, 26, and 29 the letter R indicates the guide or pointer bar, which extends transversely over a portion of the machine, and is then bent down and connected with the plate $C^2$ of the movable frame. The outer vertical portion of this guide-bar extends down in front of the pattern-board $q^3$, which is upon the casing $p^2$, and it is provided upon its end with a pointer, $r$, which will be prevented from coming into frictional contact with the pattern-board by means of a stop or projection, $r'$, which is also secured to said bar, and is provided with an enlarged end that bears against the pattern-board. This guide-bar is made in two parts, so as to be capable of being extended as may be desired, the upper portion of the bar being arranged to have a sliding connection with the lower part thereof, as shown in Fig. 27. These two parts are held together by means of a set-screw, $r^3$, which can be loosened when the length of the guide-bar is to be varied. To effect the raising of the lower portion of the bar the set-screw is provided with a handle, $r^2$, which can be grasped by the operator, and the pointer thereby raised or lowered without moving the frame, a graduated scale, $r^4$, upon the upper section of the bar indicating the extent to which the pointer is thus moved.

In operating this machine the operator will sit before the pattern-board, and by turning the crank $p^3$ control the movements of the mechanism which moves the frame carrying the rollers between which the fabric is stretched. As the said frame shifts it is obvious that it will move the pointer over the pattern-board, and hence the pointer can be guided over the pattern and its movement governed by the movement of the cloth-frame, which is controlled by the operator through the medium of the crank $p^3$, the said cloth-frame being moved for said purpose by giving the required degree of rotation to the crank $p^3$, which, as already stated, actuates the bevel-gears $N^2$, to which the levers $N'$ are pivoted, through the medium of the shaft $p'$, carrying the bevel-gears $p$, and the shafts $P'$, carrying the bevel-gears P and $P^4$. The bevel-gears $N^2$, which are rigid upon the hollow shafts containing the rods that bear upon the plate C², of course cause said shafts to rotate to the extent to which the crank-handle is turned by the operator, so that as the rods $m^2$ are swung laterally within their respective hollow shafts N by means of the levers N' and the slidable hollow cones N⁴ actuating said levers, the direction in which the plate will be moved will be controlled by the planes occupied by the bent levers, it being seen that the lever shown in a vertical plane, Fig. 33, can by a quarter rotation of the hollow shaft N be brought into a horizontal plane, or to other required positions, dependent on the extent of rotation imparted to the hollow shaft.

Figs. 35 and 36 illustrate two different positions of the levers N', in the first the hollow shafts and levers being in position to lower the plate C² and frame, and in Fig. 36 the same being in position to raise the plate and frame.

The mechanism for operating the cam-shaft which actuates the needles and the shaft which operates the thread-controlling devices is as follows: The main driving-shaft T of the machine, which extends the entire length of the front row of standards, carries at each end a spur-wheel, $t$, which spur-wheels gear with similar spur-wheels, $t'$, upon the ends of the cam-shaft G', that actuates the needle-bars. (See Figs. 1, 2, and 28.) This shaft T is provided with a pulley, T², which is driven by a belt, $t^2$, connecting said pulley with a lower pulley, T³, that is fixed upon a rotary shaft, T⁴, both of these pulleys being preferably faced with rubber. The shaft T⁴ carries at its opposite end a pulley, $t^3$, which is driven by a belt from any suitable engine. Hence the rotation of the shaft T⁴ will, through the medium of the connected pulleys T² and T³ and the spur-jaws, operate the cam-shaft which actuates the needles.

In order to cause a simultaneous movement of the rotary thread-conductors, which, it will be remembered, are actuated by the reciprocating rack-bars, I arrange upon the shaft M⁶, which is at the front of the frame-plate C², a spur-wheel, $t^4$, which meshes with the spur-wheel $t'$, that is on one end of the cam-shaft G', whereby said shaft will be rotated, and through the medium of the pulleys Q⁴ and their connecting-belt actuate the rear shaft, M, which carries at one end the cam-grooved roller $l^3$, adapted to actuate the lever L connecting with the rack-bar, as described in connection with Fig. 22 of the drawings. It will also be seen that these two shafts M M⁶ carry the cams $m$ $m'$, that serve to vibrate the pivoted levers M² and M³, already described.

The mechanism for stopping or for starting the machine comprises a rock-shaft, W, (see Fig. 28,) which is operated by two treadles, W' W', that connect with the grooved segments $w$ upon the rock-shaft by means of chains W². The rock shaft is provided with two crank-arms, W³, connecting with the pivoted levers W⁴, each of which carries upon its upper end a roller adapted to bear upon the belt $t^2$. By operating the treadles so as to press the rollers against the belt the latter will be tightened upon the pulleys T² T³, so that they will be driven. By operating these rollers so as to release them from the belt the latter will be loose upon the pulleys, and hence motion will be transmitted from the lower to the upper pulley. By depressing one of the treadles the rollers will be moved toward each other and pressed against the belt, so as to tighten it upon the pulleys, and by depressing the other treadle the belt will be loosened.

As shown in Fig. 2, the various driving mechanism for actuating the cam-shaft which operates the needle-bars, and also for operating the rack-bar that actuates the thread controllers or conductors, is inclosed by a casing, $p^2$, upon which the pattern-board is placed. The crank $p^3$, causing the movement of the hollow shaft N that carries the levers N', is within convenient reach of the operator, and the treadles extend out from the front side of said casing.

What I claim is—

1. The combination, in an embroidery-machine, of the vertically and horizontally movable frame, carrying rollers for the fabric that is to be embroidered, with the series of reciprocating needle-bars arranged at one side of the frame, the series of rotary thread-conductors arranged at the opposite side of said frame and adapted to form loops upon the needles after the latter have penetrated the fabric, mechanism timed for intermittently moving said frame the length of a stitch, and devices arranged to be under control of the operator for causing said frame in its movements to be guided in accordance with the lines of the pattern to be produced, substantially as described.

2. The combination, in an embroidery-machine, of the vertically and horizontally movable frame, carrying the rollers upon which the fabric to be embroidered is wound, with the reciprocating needle-bars and needles, and the rotary thread-conductors, adapted and arranged to form lines of chain-stitches upon the fabric, devices for automatically and intermittently moving the frame to the extent of a stitch at requisite intervals, mechanism arranged to be under the control of the operator and adapted to direct the movement of the frame, and the pattern-guide arms connected with the frame, and having a pointer arranged to move over the pattern-board, whereby the operator can direct the movements of the frame in accordance with the pattern-lines upon the pattern-board, substantially as described.

3. The combination, with the movable frame upon which the fabric to be embroidered is supported, of the series of reciprocating needle-bars, the rotary shaft provided with cams for actuating the needle-bars, the rotary thread-conductors $h^2$, adapted to form the threads into loops upon the needles after the latter have penetrated the fabric, and the reciprocating rack-bar, adapted to revolve the thread-conductor alternately in reverse directions, said members being constructed and arranged for operation substantially as described.

4. The combination, with the front row of standards, A, of the T-shaped bar secured thereon, the standards G, supported upon said bar, the rotary shaft provided with a series of cams and having its bearings in said standards, and the reciprocating needle-bars $g$, actuated by said cams, substantially as described.

5. The combination, in an embroidery-machine, of the movable frame upon which the fabric to be embroidered is supported with the horizontal reciprocating needle-bars, the hinged plate $g^3$, with openings for the passage of the needles, and the rotary thread conductors, substantially as described.

6. The combination, in an embroidery-machine, of the reciprocating needle-bars and the movable frame for supporting the fabric to be embroidered with the rotary thread-conductors $h^2$, provided with spring-rings $h^5$, and the weighted brake or tension plates H′, substantially as described.

7. The combination, with the rotary thread-conductor $h^2$, of the reciprocatory rack-bar for actuating the said thread-conductors, the vibratory levers L, pivoted to the rack-bar and connected with each other and with a vibratory lever, $L^3$, and the cam-grooved wheel adapted to actuate said levers, substantially as described.

8. The combination, in an embroidery-machine, of the vertically and horizontally movable frame, supporting rollers upon which the fabric to be embroidered is wound, with the crossed supporting-levers $E^3$, provided with wheels supporting said frame, and having the intermeshing segment-racks $E^5$, whereby the movement of one lever will cause a corresponding movement on the part of the other lever, substantially as described.

9. The combination, in an embroidery-machine, of the vertically and horizontally movable frame, carrying supports for the fabric to be embroidered, with the vertical standards E, connected in pairs by cross-bars E′, the double fork-shaped levers $E^3$, weighted at their upper ends, and having at their lower ends grooved wheels bearing upward against the said cross-bars, and the pair of intermeshing segment-racks connected with the levers, substantially as described.

10. The combination, in an embroidery-machine, of the movable frame supporting the rollers upon which the fabric is wound, and comprising the bars C, with the adjustable rods $d^3$, passing through said bars, and the stretching-plates $D^3$, connected with the adjustable rods, substantially as described.

11. In an embroidering-machine, the vertically and horizontally movable frame, comprising the bars C, the stretching-bars $D^3$, the end plates, $C^2$ and $C^3$, the rollers, and the mechanism for rotating one of said rollers, the above members being constructed and arranged substantially as described.

12. The combination, in an embroidering-machine, of the vertically and horizontally movable frame, carrying the rollers upon which the fabric to be embroidered is wound, with the horizontal rods $f$, arranged in pairs and journaled in the frame F′, and the vertical guide-rod F, passing between the said horizontal rods, substantially as described.

13. The combination, in an embroidery-machine, of the movable frame, provided with plate $C^2$ at one end and carrying supports for the fabric to be embroidered, with the vibratory lever $M^2$, and the rod $m^2$, adapted to bear against said plate and connected with the vibratory lever by a universal joint, substantially as described.

14. The combination, with the vibratory lever $M^2$, of the rod $m^2$, connected with said lever by a universal joint and passing through the hollow shaft N, the hollow cone $N^4$, arranged to slide upon the said shaft, and the lever N′, connected at one end with the rod within the hollow shaft and at its remaining end resting upon the slidable cone, substantially as described.

15. The combination, with the vibratory lever $M^3$, of the hollow cone $N^4$, arranged to slide upon a hollow shaft and connected with said lever, the lever N′, connected at one end with a rod, $m^2$, arranged to swing laterally within the hollow shaft, and having its remaining end rested upon the slidable cone, substantially as described.

16. The combination of the rotary shaft M, with the cams $m$ $m′$ secured thereon, the vibratory levers $M^2$ and $M^3$, actuated by said cams, the swinging and longitudinally-movable rod $m^2$, the slidable cone arranged upon a hollow shaft inclosing the swinging rod, and the lever N′, connected with said rod at one end and at its other end rested upon the slidable cone, substantially as described.

17. The combination, with the hollow shaft N, of the rod $m^2$, connected with a vibratory lever by a universal joint, the bevel-gear $N^2$, secured upon the hollow shaft, the lever N′, pivoted to said gear and connected with the rod $m^2$, and mechanism for rotating the bevel-gear and hollow shaft, substantially as described.

18. The combination, with the rotary shafts M and $M^6$, connected by an endless belt, of the cams $m$ and $m′$, the vibrating levers $M^2$ $M^3$, the rods $m^2$, the slidable cones $N^4$, the hollow shafts N, and the bent levers N′, and springs $n^3$, said members being constructed and organized for operation substantially as described.

19. The combination, with the rotary shaft $p′$, provided at one end with a crank, of the bevel-gear at the opposite end of said shaft, gearing with a bevel-gear upon shaft P′, the bevel-gear P on the last-mentioned shaft engaging a bevel-gear upon hollow shaft N, the lever N′, pivoted to the bevel-gear that is fixed upon the hollow shaft, and the rod $m^2$, connected by a universal joint with a vibratory lever, and also connected with the bent lever, and the cone $N^4$, adapted to slide upon the hollow shaft and actuate the lever that is pivoted to the bevel-gear and connected with the said rod, said members being constructed and adapted for operation substantially as described.

20. The combination, in an embroidering-machine, of the vertically and horizontally movable frame, carrying rollers upon which the fabric to be embroidered is wound, with devices for shifting said frame the length of a stitch after the needles have been drawn out from the fabric, the herein-described guide arranged over the pattern board, and devices for varying the direction in which the frame is shifted, substantially as described.

ALBERT HARDEGGER.

Witnesses:
ALBERT T. MOORE,
MYERS R. JONES.